United States Patent Office 3,461,887
Patented Aug. 19, 1969

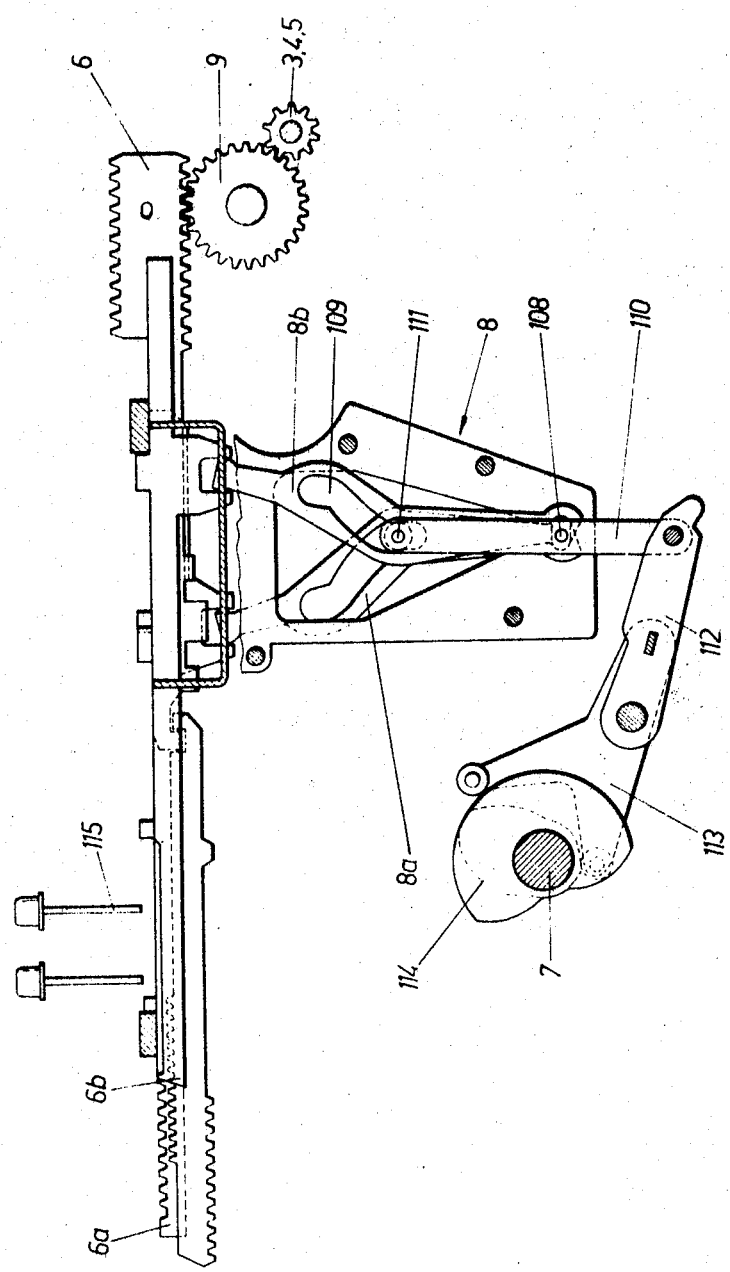

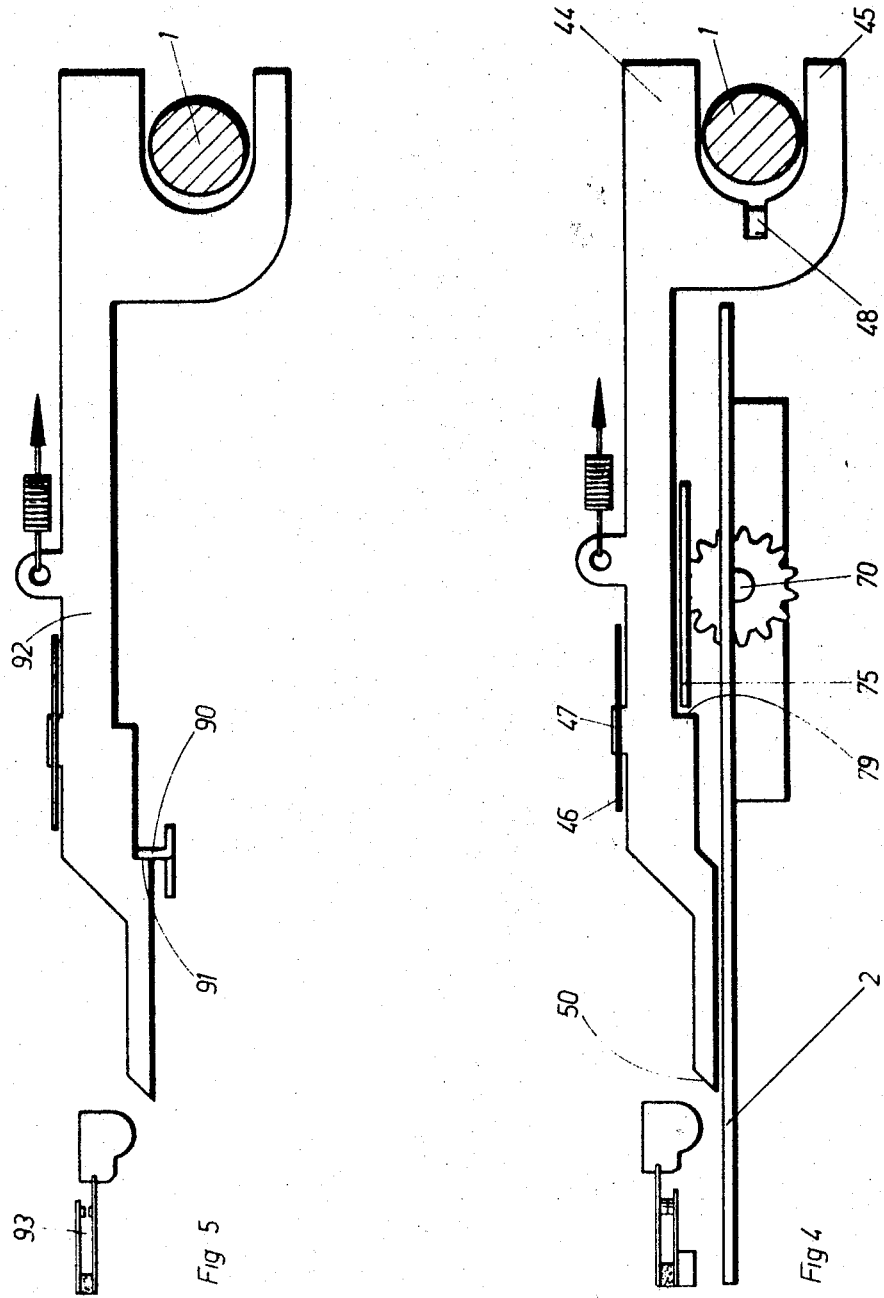

3,461,887
REGISTER CONTROLLED COIN DISPENSER
Gosta R. Englund and Rolf B. Andren, Stockholm, Sweden, assignors to Svenska Dataregister AB, a corporation of Sweden
Filed Nov. 9, 1967, Ser. No. 681,789
Int. Cl. G07d 1/02
U.S. Cl. 133—2                                     20 Claims

ABSTRACT OF THE DISCLOSURE

A coin dispensing mechanism for use with a cash register or similar machine for dispensing the least amount of coins required for any given sum. The units, tens and hundreds orders of the register actuate respective switch mechanisms which are connected to coin dispensers. The units and hundreds orders each actuate one set of switches whereas the tens order actuates either one or two sets of switches depending on whether the amount in the units order is greater or less than a predesignated amount. When the amount in the units order is greater than the predesignated amount and the appropriate switch mechanism in the tens order is actuated, an amount will be dispensed by the tens order which is a preset amount above that in the tens order. This extra amount will be subtracted from the number of units dispensed by the units order so that a coin can be dispensed by the tens order which includes both units and tens orders, for example, a 25 unit coin.

BACKGROUND OF THE INVENTION

In the operation of cash registers and similar machines where it is necessary to dispense coins, it is most advantageous if the least number of coins can be dispensed to make up any given sum. It is more desirable to dispense one 25 unit coin than two 10 unit coins and a 5 unit coin. In attempting to develop a mechanism which could accomplish this, complex equipment often resulted, since the attempt was to treat every possible sum of coins as being entirely different than every other. Thus every combination of coins required a separate mechanism in itself. There was no attempt to interrelate one order with the next so that fewer mechanisms could be used for the many different combinations of coins, such as by using the result in one order to determine the coins to be dispensed by a higher order.

This principle is used in the present invention. The units order is used to partially control dispensing in the tens order. It is used to determine whether an amount in the units order is to be transferred to the tens order so that a coin containing units and tens orders can be dispensed.

SUMMARY OF THE INVENTION

A mechanism for controlling the dispensing of coins is provided wherein when the units order registers an amount below a certain value, it actuates one set of mechanisms in the tens order so that the exact amount in the tens order is dispensed. While on the other hand, when the amount in the units order is above the specified amount, a second mechanism in the tens order is actuated wherein the amount dispensed by the tens order is the amount in the tens order plus a predesignated amount from the units order. By effecting the transfer of units from the units to the tens order, a coin containing both units and tens order can be dispensed. For example, if the specified amount in the units order is 5, any amount below 5 would actuate one set of switches in the tens order and any amount above 5 would actuate a separate set of switches.

If 24 were registered, 4 would be dispensed from the units order and 20 from the tens order. On the other hand, if 29 were registered, 4 would also be dispensed from the units order, thereby making use of the same dispensing mechanism in the units order as used in the previous case of 24; but now 25 would be dispensed from the tens order. The 5 units from the units order has been carried to the tens order so that the single 25 unit coin can be dispensed by the tens order.

BRIEF DESCRIPTION OF THE DRAWINGS

FIG. 3 is a lateral view illustrating how the device is driven from the main shaft of a cash register in accordance with the invention.

FIG. 4 is a lateral view of a feeler slide with ancillary parts.

FIG. 5 is a lateral view of another feeler slide with ancillary parts.

DESCRIPTION OF THE PREFERRED EMBODIMENT OF THE INVENTION

Figure 1:
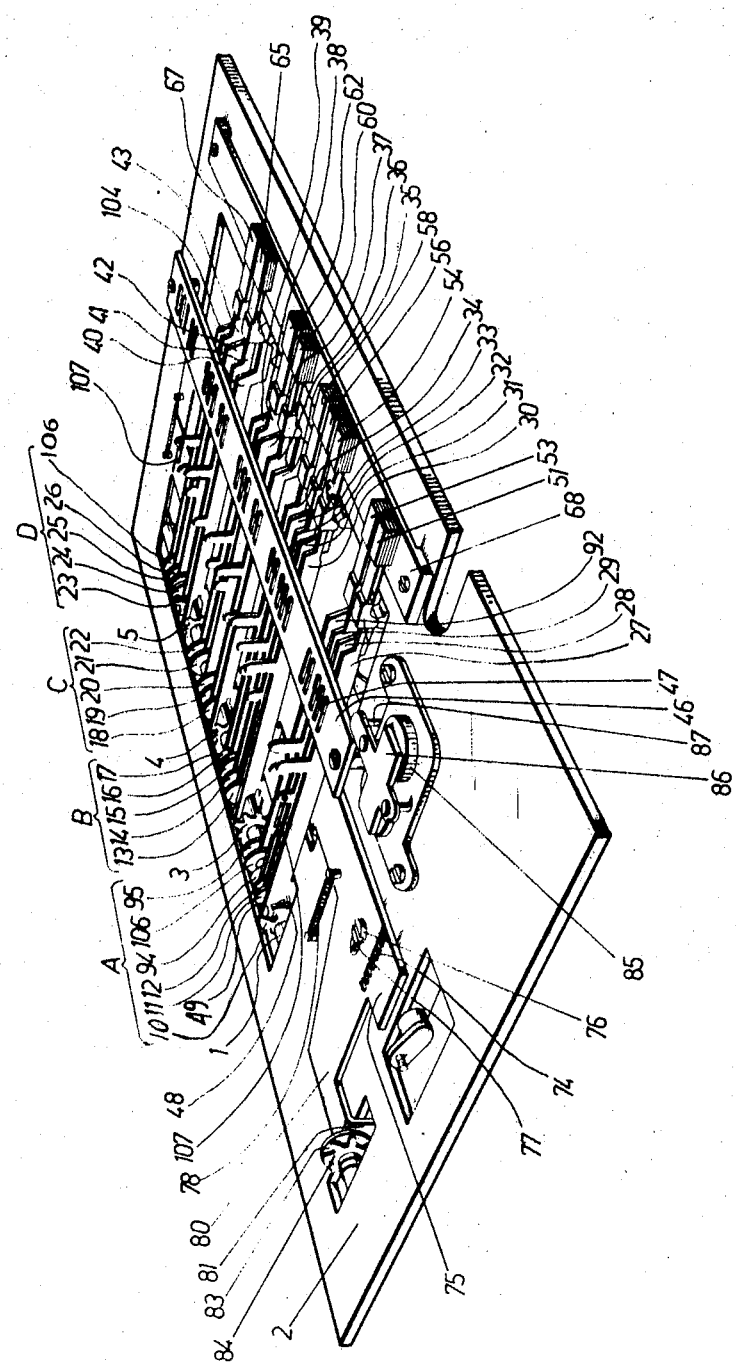
FIG. 1 is a perspective view of the coin combination selector of the invention as seen from above.

The setting device in the machine, see FIG. 3, consists of racks 6 which drive gears 3, 4 and 5 via intermediate gears 9. Each rack 6 is loosely coupled to amount rack 6a and complement rack 6b. This union is effected by means of a projection on rack 6, which engages corresponding projections on racks 6a and 6b. Each pair of racks (6a and 6b) receive their movement from differential rack drive mechanism 8. This drive mechanism consists of a pair of scissor-like arms, 8a and 8b; the end of one arm is engaged with amount rack 6a and the end of the other arm is engaged with complement rack 6b. Arms 8a and 8b which each have a slot 109, are pivoted about a common point 108. Roller 111 is mounted within slot 109 for relative movement of the arms. Links 110 receive their movement from link 112, which is actuated by a fork-shaped cam follower arm 113, that rides on the periphery of one of the cams 114 on main shaft 7.

For a detailed description of the construction and function of the differential rack drive mechanism, reference is made to U.S. Patent No. 3,040,978 by G. R. Englund and U.S. Patent No. 3,263,915 by G. R. Englund and M. E. Mattsson. These patents have been assigned to the assignee of the present invention.

When an amount is to be entered in the machine, amount rack 6a in each decade moves to the right until stopped by depressed key 115. The remaining movement, given to racks 6a and 6b by the differential rack drive mechanism moves complement rack 6b a specified distance to the left. This movement of racks 6a and 6b is caused by the upward movement of links 110, with roller 111 forcing the slot provided ends of arms 8a, 8b towards each other. For all number positions, the sum of the distance travelled by amount rack 6a and complement rack 6b is always constant.

When amount rack 6a moves to the right, it takes with it rack 6, which via intermediate gear 9 in the relevant decade turns gear 3, 4 or 5. Because of the loose union between racks 6a, 6b and 6, the latter will remain in the setting it has received when the differential drive mechanism restores racks 6a and 6b to their initial positions by the downward movement of links 110. Thus gears 3, 4 and 5 will remain in the setting they have received by racks 6 until racks 6a, 6b are again operated when the gears 3, 4 and 5 and the rack 6 will be returned to zero before another amount is to be entered in the machine.

Gears 3 and 5 are directly connected each to their own group of code discs (as shown in FIG. 1); gear 3 is connected to group A which contains code discs 10–12, 94 and 95, and gear 5 is connected to group D which contains discs 23–26. The discs are mounted on sleeves which surround shaft 1, so that they rotate with respect to the shaft. Gear 4 is directly engaged with two groups of code discs B and C, consisting of code discs 13–17 and 18–22 respectively. These discs are also mounted on sleeves which surround shaft 1. Each of the code discs works in conjunction with one of the feeler slides 27–43. The slides are spring loaded forward by springs 107, i.e., in a direction towards the code discs. All feeler slides 27–43 are of the same design. Each has two forward-pointing arms, 44 and 45 (see FIG. 4), which extend beyond and on each side of shaft 1 between two code discs or between one code disc and one steering disc 106. The steering discs will be subsequently described. In this way, feeler slides 27–43 are guided in relation to the code discs and shaft 1. The other ends of the feeler slides are steered between plate 46 and plate 2. Each feeler slide 27–43 has a lug 47 which is guided in a slot in a corresponding plate 46.

Figure 8:
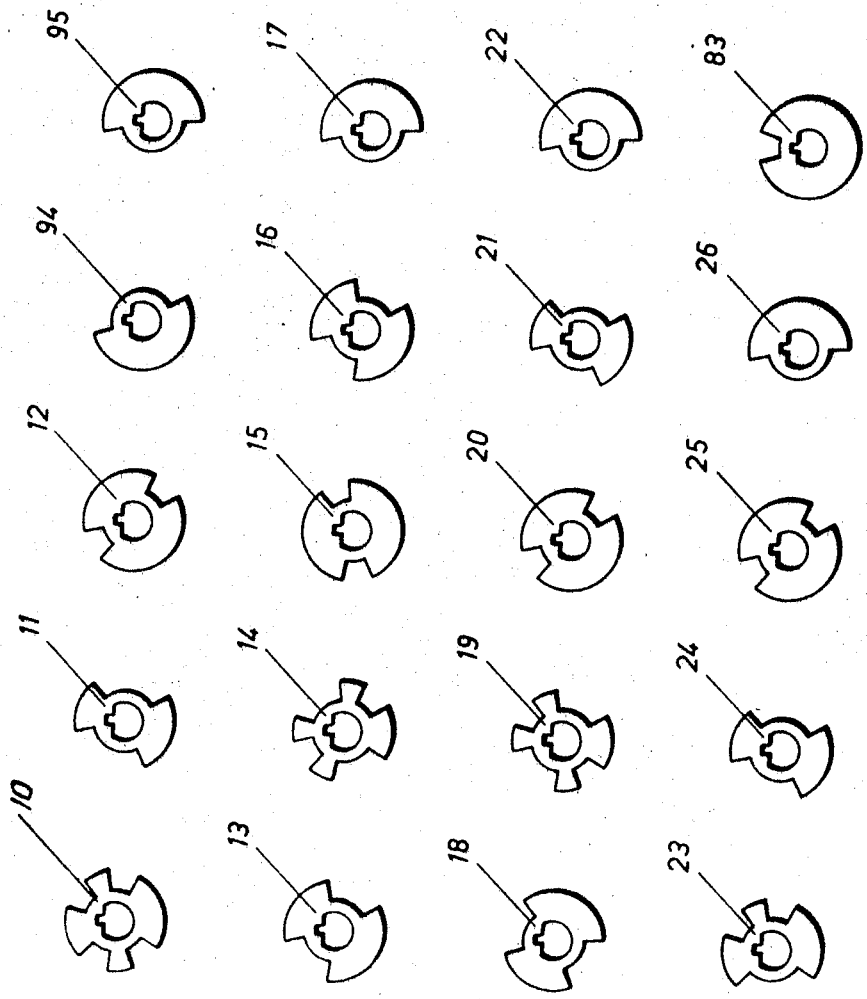
FIG. 8 is a detailed view of the code discs.

A lug 48 on each of the feeler slides 27–43 between arms 44 and 45 at the front end is laterally displaced in relation to the slide to operate in conjunction with an adjacent code disc. The periphery of each code disc has one or more cut-outs 49, positioned as shown in FIG. 8. It will be evident that all the discs in FIG. 8 are positioned on the shaft in the same position as shown in FIG. 8 so that the keyways therein are aligned. The relative configuration of the discs can then be readily determined. The following table shows the coin dispensed by each disc.

Coin to be dispensed
(units and tens): Code disc No.

Group A

| | |
|---|---|
| 1 | 10 |
| 2 | 11 |
| 2 | 12 |
| Below 5 | 94 |
| Over 5 | 95 |

Group B

| | |
|---|---|
| 5 | 13 |
| 10 | 14 |
| 10 | 15 |
| 25 | 16 |
| 50 | 17 |

Group C

| | |
|---|---|
| 5 | 18 |
| 10 | 19 |
| 10 | 20 |
| 25 | 21 |
| 50 | 22 |

Group D
Coins to be dispensed
(hundreds):

| | |
|---|---|
| 1 | 23 |
| 2 | 24 |
| 2 | 25 |
| 5 | 26 |

It should be noted that discs 13 and 16, which together dispense 30 units are only opearted together and not separately and are only operated when the amount in the units order is less than five and it is desired to dispense 30 units from the tens order, such as for dispensing 30 to 34 units.

Discs 94 and 95 control which set of discs in the tens order operates, Group B or Group C. Lug 48, on a slide can either lie against the code disc periphery and in this way hold the slide in a position to the rear, or enter a cut-out in the disc, allowing the spring to draw the slide to a forward position. The rear end of each slide 27–43 is shaped as a camming surface 50 (FIG. 4) to open contact points 51–67 when it moves to the rear. The contact points are mounted on support plates 68 and 69 on each side of plate 2 and are each electrically joined to a device for dispensing a coin of a particular value.

Shaft 70 is mounted in holes in two downward-pointing brackets 71 on the underside of plate 2. Two gear wheels 72 which are mounted on shaft 70 protrude through cutout 73 in plate 2 to mesh in a row of slots 74 in plate 75. The plate which slides on plate 2 is guided by two screws 76, secured to plate 2 and positioned in slots 77 in plate 75. Plate 75 is biased forward by two springs 78.

Figure 2:
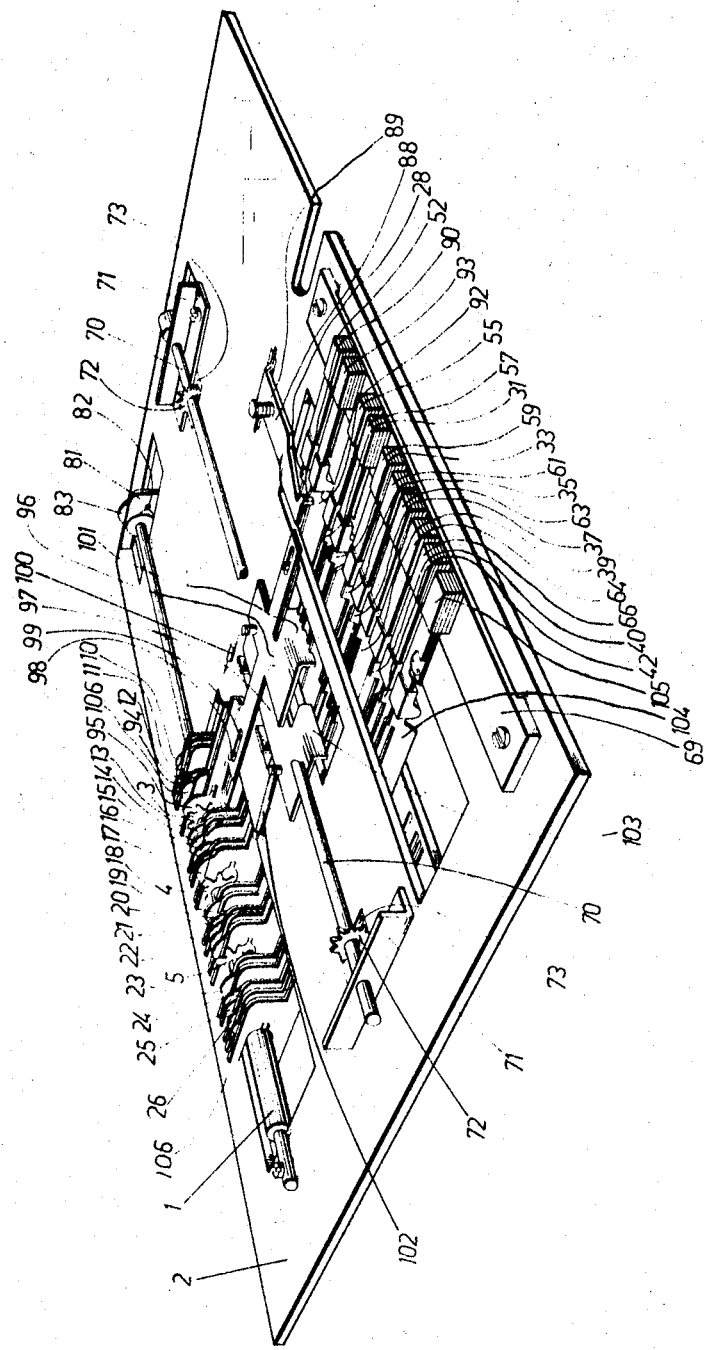
FIG. 2 is a perspective view of the device of FIG. 1, as seen from below.

Shaft 70 rotates in a counterclockwise direction (as seen in FIG. 4) during each cycle. The rotation moves plate 75 rearwards (to the left as shown in FIG. 4) so that its rear edge engages a shoulder 79 (FIG. 4) on each slide 27–43, moving it to the rear and opening contacts 51–67. At the end of the machine cycle, shaft 70 turns clockwise causing plate 75 to move forward, at which point the slides, having lugs 48 which will enter a slot in a corresponding code disc, are allowed to move forward under spring bias and close their respective contacts 51–67. This, however, should only take place during a certain machine operation; for this reason, plate 75 has an L-shaped arm 80, the front end of which, 81, is bent downwards and fitted with a lug 82 (FIG. 2), which is laterally displaced in relation to the downward bent section 81 of arm 80. Lug 82 works in conjunction with a code disc 83. The code disc is loosely mounted to turn on shaft 1, and is fixed to gear wheel 84. This latter wheel receives its setting from the machines operation determining means in the same way as gears 3, 4 and 5 which have been described above. Code disc 83 is designed in the same way as the code discs previously mentioned, but has only one slot (see FIG. 8), which means that plate 75 can move forward only during a certain machine operation.

Figure 7:
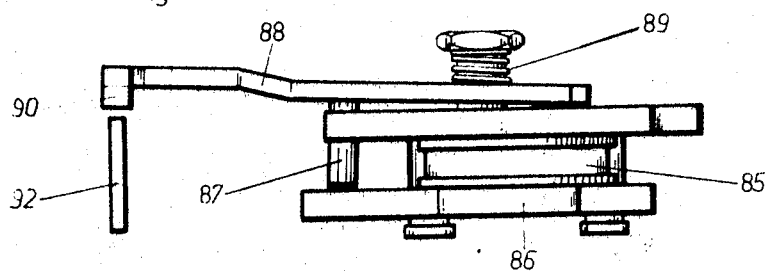
FIG. 7 is a plane view of a device for preventing the coin dispensers from being actuated more than once during the same cycle.

When plate 75 has moved forward and slides 27–43 have received their settings, the corresponding amount of money can be fed out by the coin dispensing devices. To prevent the dispensers from being actuated to make a series of payments without receiving a setting between individual payments, coil 85 (see FIG. 7) receives an electrical pulse when the dispensing devices are actuated. Coil 85 attracts armature 86, which via push rod 87, operates lever 88, which is biased towards coil 85 by compression spring 89. Lever 88 has an upward-bent ear 90 (FIG. 5), which when the lever is in the position of FIG. 5, lies against shoulder 91 on slide 92 and prevents slide 92 from moving forward. Slide 92 is of the same shape as slides 27–43, but does not work in conjunction with any code disc. When slide 92 is in its rear position (after being moved to the left in FIG. 5), contacts 93 are kept closed, but when armature 86 moves up (FIG. 7) due to the electrical pulse received by coil 85, lever 88 is moved so that ear 90 releases slide 92, which moves forward (to the right in FIG. 5) under spring tension breaking contacts 93. This cuts off the power supply to the coin dispensing devices, and no additional payments can take place. Slide 92 is restored at the beginning of the next machine cycle by plate 75 and when shoulder 91 passes ear 90 on lever 88, it is biased into position by its spring 89 to its rear position, whereby contacts 93 are closed.

Included in Group A there are three code discs, 10, 11, and 12, which each work in conjunction with their respective feeler slides 27, 28 and 29. Slide 27, as it moves forward, closes contacts 51 which are connected to a dispenser for a one unit coin, while slides 28 and 29 close contacts 52 and 53, each of which are coupled to a dispenser for one 2 unit coin. The discs in Group A can be set in 10 different positions representing the values 0–9 in the units decade of the machine. However, the code discs are so designed that positions "5" to "9" give the same result as positions "0" to "4." This means that if the machine is set for 8 units, the code discs give the same result as they would have done if the machine were set for 3 units. The reason for this will be explained in greater detail subsequently.

Figure 6:
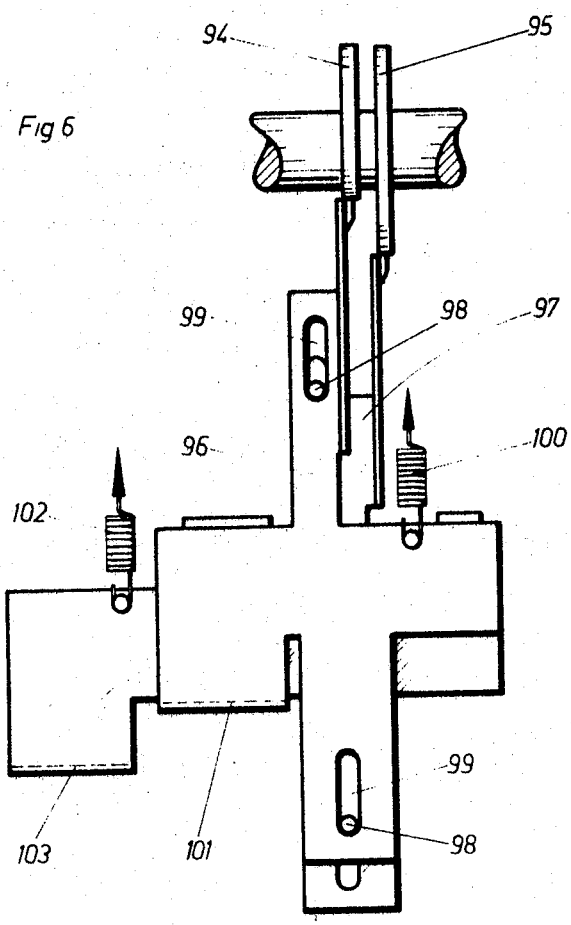
FIG. 6 is a plane view of a device for blocking certain feeler slides.

There are two additional code discs, 94 and 95 in Group A. These code discs each work in conjunction with their own feeler slides, 96 and 97, respectively. The feeler slides are steered by two studs 98, which are secured to the underside of plate 2 (FIGS. 2, 6) and are guided by slots 99 in slides 96 and 97.

The slides are guided at right angles to the axis of shaft 70. Slide 96 is drawn forward (upward in FIG. 6) by spring 100. This slide has an upward bent edge 101 (FIG. 2), which contacts shoulder 79 (FIG. 4) on the feeler slides associated with the code discs in Group B. Slide 97 is drawn forward by spring 102 and has an upward-bent edge 103 (FIG. 2) which contacts shoulder 79 on the feeler slides associated with the code discs in Group C.

Code discs 94 and 95 are so designed that the feeler slides which work in conjunction with the code discs in Group C are held in a rear position by edge 103 of slide 97 when the machine is set for a number, whose units value is less than 5, and the feeler slides which work in conjunction with the code discs in Group B are held in their rear position by edge 101 of slide 96 when the machine is set for a number whose units value is five or more.

Contacts 54–58, which work in conjunction with the code discs in Group B, are located in the circuit leading to the same dispensing device as the corresponding contacts 59–63 in Group C. Slides 30–34 are associated respectively with coded discs 13–17 in Group B, and slides 35–39 are associated respectively with coded discs 18–22 in Group C. The code discs in Group C are designed so as to always give a value 5 units higher than that given by the code discs in Group B. The code discs in Group B always are set to the amount that is in the tens order of the machine. This difference in setting operates such that the feelers associated with Group C are inactive when the units value is below 5 and the feelers associated with Group B are inactive when the units value is above 5. The individual contacts in Groups B and C are connected so that contacts 54 and 59 are coupled with a dispensing device for one 5 unit coin; contacts 55 and 60, and 56 and 61, are each coupled to their own dispensing device for one 10 unit coin, while contacts 57 and 62 are each coupled to a dispensing device for one 25 unit coin and contacts 58 and 63 are each coupled to a dispensing device for one 50 unit coin. The arrangement is such that the units order will only control the dispensing of an amount which is less than five units. If an amount greater than five is in the units order, the amount above five units is transferred to Group C. This takes place, since Group C which is operable only when the units order is set at 5 or more, is set to 5 units more than the value in the tens order of the register. So, for example, if 27 units were in the register, Group C would register 25 units, while Group A, the units order, would register 2 units. The dispensing means associated with Group C would then be actuated to dispense one 25 unit coin and the dispensing means associated with Group A would be actuated to dispense one 2 unit coin. Thus only two coins would be dispensed. However, if the 5 units were not transferred, the 25 unit coin would not be dispensed from the tens order and instead three 2 unit coins and one 1 unit coin would be dispensed from the units order while two tens unit coins would be dispensed from the tens order. There would be a total of 6 coins instead of the 2 coins aforementioned. Thus by the 5 units transfer feature, the fewest number of coins is dispensed to achieve an amount.

It will also be seen that the 5 units transfer feature in the tens order is operable even when there are no coins to be dispensed in the tens order, as for example, if the total amount to be dispensed is 8, the 5 unit coin will be dispensed by the dispenser controlled by Group C.

For monetary systems which have hundreds order coins, such as the Swedish system, dispensing of hundreds order coins is controlled by the discs and associated feelers of Group D.

Group D has four code discs 23–26 with ancillary feeler slides 40–43 and contacts 64–67. Contacts 64–67 are connected respectively to dispensing devices for one 1 hundred unit coin, one 2 hundred unit coin, and one 5 hundred unit coin. This group is actuated and restored in the same way as the other groups and can be set in ten different positions to represent values from 0 hundred to 9 hundred. Group D also contains a slide 104 which does not work in conjunction with a code disc. Slide 104 is actuated and restored in the same way as the other slides and works in conjunction with a pair of contacts 105 which are connected in the power supply line to the dispensing devices. Contacts 105 are closed when the machine is at rest, but are opened as soon as a machine cycle is commenced and plate 75 moves to the rear. The purpose of slide 104 and contacts 105 is to cut off the power supply to the dispensing device for one machine cycle, preventing payments from taking place before the setting is complete and the machine cycle terminated.

As an example of machine operation, if the setting received during a machine cycle is 1:24 (in the Swedish monetary system) the code discs in Group A will be set in position "4," groups B and C in position "2" and Group D in position "1." When plate 75 moves forward at the end of the machine cycle, lugs 48 on slides 28, 29, 31, 32, 38, 40 and 96 will be positioned opposite a slot in their respective code discs. Because the setting in the units decade is less than 5, slide 97 will keep the slides in Group C inactive. As a result of this, slides 28, 29, 31, 32 and 40 will move forward and close their respective contacts 52, 53, 55, 56 and 64, which means that two ore (a Swedish unit coin) coins, two 10 ore coins and one 1 crown (a Swedish hundred unit coin) coin will be issued by the coin dispensing devices.

During another machine cycle, the machines received a setting of 1:26, also in the Swedish system, Groups B, C, and D receive the same settings in the previous example above and Group A is set in position "6." This means that lugs 48 on slides 27, 31, 32, 38, 40 and 97 are positioned opposite a slot in their respective code discs. Since the value in the units decade is higher than 5, slide 96 will keep the slides in Group B inactive. However, slides 27, 38 and 40 move forward and close contacts 51, 62 and 64 to cause one 1 ore coin, one 25 ore coin and one 1 crown coin to be dispensed by the dispensing mechanism.

While I have described a specific embodiment of my invention, it should be understood that I desire to protect all changes and modifications thereto which fall within the scope and spirit of the invention.

I claim:

1. A mechanism for actuating a dispensing device which is adapted to operate with a registering mechanism comprising:
   first means which is set to a position related to an order of a registering mechanism;
   second means which is set to a position related to a different order of the registering mechanism; and
   first feeler means responsive to the position of said second means to actuate a dispensing device when said first means is set for a value which is within a predesignated range of values.

2. The mechanism of claim 1 wherein:
   second feeler means is provided which is responsive to the position of said second means to actuate a dispensing device when said first means is set for a value which is greater than the predesignated range of values.

3. The mechanism of claim 2 wherein:
the predesignated range of values is zero to four, inclusive.

4. The mechanism of claim 2 wherein:
said second means comprises setting means which is set to the amount in an order of a register;
first coded means which is settable to the same amount as said setting means; and
second coded means which is settable to an amount which is equal to the value in said setting means, plus an amount which is greater than said predesignated range of values.

5. The mechanism of claim 4 wherein:
said setting means comprises a series of gears which are connected to and set by the registering mechanism.

6. The mechanism of claim 4 wherein:
said first and second coded means comprise a series of discs which have means therein so that in a predesignated position said feeler means will sense said means to actuate the dispensing device.

7. The mechanism of claim 6 wherein:
said means in said discs comprises slots.

8. The mechanism of claim 6 wherein:
a third coded means is provided which is associated with said means and which contains a coded disc therein which by means of an associated feeler means renders said second feeler means inactive when said first setting means is set for a value within said predesignated range of values.

9. The mechanism of claim 8 wherein:
a coded disc is provided in said third coded means which by means of an associated feeler renders said feeler means inactive when the setting means are set for a value greater than said predesignated range of values.

10. The mechanism of claim 9 wherein:
biasing means is provided to cause said feelers to be directed toward said coded means and wherein a common restoring means is provided to return said feeler means.

11. The mechanism of claim 10 wherein:
said restoring means is controlled by steering means which permits the restoring means to release said feeler means for sensing the coded discs when the registering mechanism that it is adapted to be used with is in a predesignated part of its cycle.

12. The mechanism of claim 11 wherein:
said steering means comprises a coded disc which is set by means of a gear wheel.

13. The mechanism of claim 1 wherein:
the dispensing device comprises a series of electric contacts each of which is coupled to a dispenser for a coin of a particular value.

14. The mechanism of claim 13 wherein:
an electric contact is closed when a feeler means senses a predesignated position of its associated coded disc.

15. The mechanism of claim 13 wherein:
an electric contact is open when a feeler means senses a predesignated position of its associated coded disc.

16. The mechanism of claim 1 wherein:
means is provided whereby the dispensing device can only be actuated once during a cycle of the registering mechanism with which it is adapted to be used.

17. The mechanism of claim 16 wherein:
when the dispensing device has been actuated, a circuit is completed which causes a coil to attract an armature and thereby actuate a lever to permit a slide to move and open the circuit that supplies power to the dispensing device.

18. A mechanism adapted to operate with a registering mechanism comprising:
first setting means which is set to an amount related to an order of a registering mechanism;
second setting means which is set to an amount related to a different order of a registering mechanism;
first coded means which is settable to the same amount as said second setting means;
second coded means which is settable to an amount which is a predesignated value above the amount of said second setting means;
first feeler means to sense the position of said first coded means, which feeler means is rendered inactive when its first setting means is set for a value which is equal to or greater than a predesignated value;
second feeler means to sense the position of said second coded means, which feeler means is rendered inactive when the amount in said first setting means is below said predesignated value; and
a dispenser actuated by said feeler means in accordance with the positioning of said coded means to dispense items.

19. A mechanism for actuating a dispensing device, which is adapted to operate with a registering mechanism comprising:
setting means which is set to the amount in an order of a register;
first coded means which is settable to the same amount as said setting means;
second coded means which is settable to an amount which is a predesignated value above the amount of said setting means; and
means responsive to said coded means to actuate a dispensing device.

20. A mechanism for actuating a dispensing device, which is adapted to operate with a registering mechanism comprising:
first means which contains at least one device to dispense a preset amount if it is set to that amount or if it is set to an amount that is a predetermined amount above that amount; and
second means which is operable to dispense the predetermined amount.

References Cited

UNITED STATES PATENTS

| | | | |
|---|---|---|---|
| 2,127,642 | 8/1938 | Dieserud | 133—2 |
| 2,605,774 | 8/1952 | Damon et al. | |
| 2,864,385 | 12/1958 | Buchholz et al. | 133—2 |

SAMUEL F. COLEMAN, Primary Examiner